UNITED STATES PATENT OFFICE 2,687,957

LIGHT-SENSITIVE PHOTOGRAPHIC ELEMENTS CONTAINING AZO PYRAZOLONES BLEACHABLE IN FERRICYANIDE COMPOSITIONS

Joseph A. Sprung, Easton, Pa., assignor to General Aniline & Film Corporation, New York, N. Y., a corporation of Delaware No Drawing. Application December 8, 1948,
Serial No. 64,251

8 Claims. (Cl. 95—2)

This invention relates to color photography and particularly to azo pyrazolones as filter and anti-halation dyes for photographic color film.

It is known in the art of making photographic materials, such as multilayer color films, that color separation by the various layers is facilitated by the use of filters, either incorporated directly into the emulsion layers or added as adjacent layers in the appropriate sequence; for example, blue light passing through the unsensitized blue sensitive layer must be absorbed by a "minus blue" (i. e., yellow) filter to prevent it from exposing the underlying ortho and panchromatic emulsion layers which are likewise sensitive to blue light. Similarly, green absorbing filters are frequently desirable in order to obtain a better separation between the orthochromatic and the panchromatic layers. Other filters with special characteristics are occasionally used, depending upon the absorption desired.

In a similar manner, colored light-absorbing layers are frequently used adjacent to a photographic support to prevent light scattering or halation effects caused by refraction of light rays from the support onto the sensitive layer. Such layers are commonly known as anti-halation layers.

In order to perform their desired function, filter and anti-halation materials must be reasonably stable in a colloid carrier. They must be non-diffusing and readily removable in the customary processing baths. Moreover, it is essential that they have no injurious effects, such as fogging action, on the emulsion layers. Many materials suggested in the art as suitable for filter layers fail to fulfill completely all of the above requirements.

Various azo pyrazolones have been utilized by the art in the preparation of photographic color film. Azo pyrazolones, which are derived from diazotizable amines containing a variety of substituents in the aromatic nucleus, have been utilized as colored couplers in a gelatino silver-halide layer either alone or in admixture with uncolored couplers for the production of color corrected (masking) images. The colored couplers containing an azo substituent in the reactive coupling position react in color forming development with the oxidation product of an aromatic primary amino developer in the usual manner to form colored images. In this coupling reaction the azo group of the colored coupler is displaced imagewise during azomethine dye image formation.

Azo pyrazolones having the function of a filter dye and a color coupler have also been utilized in at least one of the silver-halide emulsion layers of a light sensitive multi-layer material. The azo dye is first utilized as a filter dye and then destroyed by chemical reducing baths, such as sodium hydrosulfite solution or a black and white developer containing a fairly large amount of sodium sulfite to yield a compound which is capable of forming a dye by the process of color development.

Azo dyes containing electronegative substituents have also been utilized as non-diffusing coloring matter in light sensitive photographic materials for many purposes. The azo dyes may be discharged indiscriminately after serving their function as filter dyes by means of sodium hydrosulfite or sodium stannite solutions, and when used for the silver azo dye bleachout process by bleaching selectively in situ with the silver image by means of specially compounded bleach or reducing solution.

None of the azo pyrazolones utilized by the art for the foregoing purposes has been described as capable of being discharged in a ferricyanide bleach composition. This may be due to the fact that none contained the appropriate electropositive substituents in the azo dye molecule.

The primary object of the present invention is to provide a class of non-diffusing azo pyrazolones as filter and antihalation dyes, in which the aromatic radical joined to the pyrazolone by the azo group is the residue of a diazotizable aromatic amine having a potent electro-positive substituent in its molecule.

Another object is to provide non-diffusing azo pyrazolones as filter and anti-halation dyes which are unaffected in the usual processing baths, but readily dischargeable or bleached in a standard ferricyanide bleach composition normally employed for the removal of metallic silver.

A still further object is to provide azo pyrazolones for the filter and anti-halation layers of a multilayer color film.

Other objects and advantages of this invention will be apparent by reference to the following specification, in which its preferred details and embodiments are described.

I have discovered that any non-diffusing azo pyrazolone in which the aromatic radical joined to the pyrazolone by the azo group contains at least one potent electro-positive substituent in its molecule, preferably in the para-position of the aromatic nucleus, is particularly adaptable for the preparation of filter and anti-halation layers in a multilayer color film. The azo pyrazolone so constituted, after serving its function as a filter or anti-halation dye, is readily dischargeable in a ferricyanide bleach bath during the usual processing after exposure, color development or black and white development followed by color development (in the case of a reversible multilayer color film). The azo group of the pyrazolone is not displaced imagewise during color development because it is not present in the silver-halide layer and is only destroyed or bleached indiscriminately when subjected to a treatment in the ferricyanide bleach bath composition which is normally employed to remove the metallic silver image.

By "potent electro-positive substituent" is meant those substituents which are strongly electron donating in character, such as amino, alkylamino, dialkylamino, arylamino, alkarylamino, hydroxl, and others as will be pointed out hereinafter.

In addition to a potent electro-positive substituent, the aromatic radical joined to the pyrazolone by the azo group may also contain other electro-positive, neutral or electro-negative substituents. Electro-positive radicals are, for example, alkoxyl, acylamido, etc. Neutral substituents or radicals are, for example, hydrogen and alkyl groups, e. g., ethyl, methyl, propyl, and the like. Electro-negative substituents are those which possess electron-attracting properties, such as nitro, sulfo, and carboxyl groups.

The azo pyrazolones utilized according to the present invention are obtained by coupling any diazotizable amine of the type common in diazotype chemistry and containing a potent electro-positive substituent mentioned above, with any pyrazolone containing a non-diffusing group in either 1 or 3 position.

By "non-diffusing" is meant any group or radical which is attached to the 1 or 3 position of the pyrazolone and which prevents the pyrazolone from migrating from one layer to another. Several methods have been proposed to prevent migration of not only pyrazolones, but other color formers from silver-halide emulsion layers by rendering such color formers "fast to diffusion in gelatin." This result may be accomplished in several ways as, for example, by introducing into the 1 or 3 position of the pyrazolone a suitable group or radical which imparts substantive characteristics to the pyrazolone which combine permanently with the gelatin and other colloidal materials of the silver-halide emulsions, or by enlarging the substituent group of the pyrazolone with a long chain aliphatic radical so that the pyrazolone is incapable of diffusing from the gelatin or other colloidal material. Examples of such methods which render color formers fast to diffusion by imparting substantive characteristics thereto are disclosed in United States Patent 2,179,228. Examples of color formers which are rendered fast to diffusion by enlarging the substituent group are disclosed in United States Patents 2,178,612, 2,179,244, 2,179,234, 2,179,238, 2,179,239, 2,179,344, 2,186,045, 2,186,719, 2,186,732, 2,186,733, 2,186,734, 2,186,849, 2,186, 851, 2,186,852, 2,200,306, 2,280,722, 2,292,575, 2,303,928 and 2,307,399. By reference to the latter patents, it will be noted that the color formers are modified by the inclusion of radicals of resins, polypeptides, hydrogenated ring systems, carbohydrates, long alkyl chains, and by having the substituent radical recur a number of times in the final molecule. It is to be understood that the substituent groups in the 1 or 3 position of the azo pyrazolones of the present invention, in addition to those previously mentioned, include any substantive groups or molecular enlarging groups for the purpose of rendering the azo pyrazolones fast to diffusion.

Non-diffusing pyrazolones utilized as color formers are legion and for the purpose of the present invention it is to be understood that any pyrazolone which is non-diffusing in gelatin (i. e., has a non-diffusing group in either 1 or 3 position) and of the type employed in the photographic color art, may be utilized in preparing the azo derivatives. It is to be further understood that simple azo pyrazolones, i. e., without non-diffusing groups, may also be employed, provided that the dyes are rendered non-diffusing by mutual precipitation with acidic or basic reagents of the type known in the color photographic art. As examples of illustrative non-diffusing pyrazolones, the following may be mentioned:

1-(3'-sulfo-5'-stearoylamino-6-methyl phenyl)-3-methyl-5-pyrazolone 1-(4'-sulfophenyl)-3-(4''-stearoylaminophenyl)-5-pyrazolone 1 - (4' - stearoylaminophenyl) - 3 - methyl - 5 - pyrazolone 1-phenyl-3-heptadecyl-5-pyrazolone 1 - (3 - carboxyphenyl) - 3 - heptadecyl - 5 - pyrazolone 1 - phenyl - 3 - heptadecylpyrazolone - 4' - sulfonic acid 1 - phenyl - 3 - undecylpyrazolone - 3' - carboxylic acid 3 - heptadecylpyrazolone - (5) - 1 - ethane - sulfonic acid 1 - (phenyl - 3' - methylene - ω - sulfonic acid) - 3-heptadecyl-5-pyrazolone 1 - (phenyl - 4' - hydroxy - ethylene - ω - sulfonic acid) -3-undecyl-5-pyrazolone 1 - (α - naphthyl - 4' - sulfo) - 3 - methyl - 5 - pyrazolone 1 - β - naphthyl - 3 - p - chloroacetanilido - 5 - pyrazolone 1 - phenyl - 3 - acet - α - naphthylamido - 5 - pyrazolone 1 - (α - quinolyl) - 3 - anilino - 5 - pyrazolone 1 - [p - (benzenesulfonamino) - phenyl] - 3 - methyl-5-pyrazolone p - (3 - methyl - 5 - pyrazolonyl - 1) - benzenesulfonamide 1 - [p - (p' - phenoxybenzenesulfonamido) - phenyl] - 3 - m - amyl - 5 - pyrazolone 1 - [p-(p' - sec. maylbenzenesulfonamido)-phenyl] - 3 - m - pentadecyl - 5 - pyrazolone 1 - (p - m - pentanesulfonamidophenyl) - 3 - methyl-5-pyrazolone In addition to the foregoing non-diffusing pyrazolones, the pyrazolones illustrated in Example 1 of the United States Patent 2,186,719, Example 3 of United States Patent 2,186,852, Examples 6 to 8 of United States Patent 2,179,239, and Examples 1 to 52 of United States Patent 2,369,489, may also be employed in preparing the azo derivatives.

In preparing the azo derivatives, the non-diffusing azo pyrazolones are coupled with a diazonium salt in the usual manner. Any primary aromatic amine containing a potent electro-positive substituent preferably in the para-position, with or without the presence of other substituents and in the aromatic amino nucleus capable of undergoing the diazotization reaction may be employed in the preparation of the diazonium salt. The amines preferred are characterized by the following general formula:

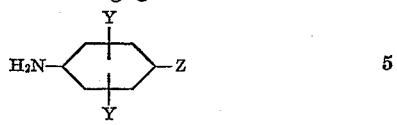

wherein Y represents hydrogen, halogen, e. g., bromine, chlorine, etc., alkyl, e. g., methyl, ethyl, propyl, butyl, etc., alkoxy, e. g., methoxy, alkoxy, propoxy, etc., aryl, e. g., phenyl, phenylene, naphthyl, biphenylyl, etc., acylamino, e. g., formylamino, acetylamino, propionylamino, etc., sulfonamido, carboxyl, carbamyl and sulfamyl groups, and Z represents a potent electro-positive substituent, such as amino, hydroxyl, alkylamino, e. g., methylamino, ethylamino, propylamino, isopropylamino, butylamino, isobutylamino, etc., dialkylamino, e. g., dimethylamino, diethylamino, dipropylamino, dibutylamino, etc., cycloalkylamino, e. g., cyclobutylamino, cyclopentylamino, cyclohexylamino, etc., hydroxyalkylamino, e. g., hydroxymethylamino, hydroxyethylamino, hydroxypropylamino, etc., di-(hydroxyalkyl) - amino, e. g., di - (2' - hydroxymethyl) - amino, di - (2' - hydroxyethyl) - amino, etc., N - alkyl - hydroxyalkylamino, e. g., N - ethyl-N - (2' - hydroxyethyl) - amino, N - methyl - N-(2'-hydroxyethyl) -amino, and the like, arylamino, e. g., phenylamino, α- and β-naphthylamino, etc., diarylamino, e. g., diphenylamino, etc., alkylarylamino, e. g., N-phenyl-methylamino, N-phenyl-ethylamino, etc., alkyl-aralkylamino, e. g., N-benzyl-ethylamino, etc., and an N-heterocyclic radical joined to the benzene ring by its nitrogen atom, e. g., morpholinyl, thiomorpholinyl, piperidyl, and the like.

As examples of illustrative amines, the following may be mentioned:

(1) 4-dimethylaminoaniline (2) 4-diethylaminoaniline (3) 2-methyl-4-diethylaminoaniline (4) 2-ethoxy-4-diethylaminoaniline (5) 5-dimethylamino orthanilic acid

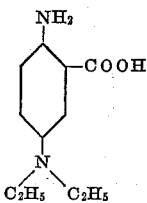

(6) 4-(di-β-hydroxyethylamino)aniline

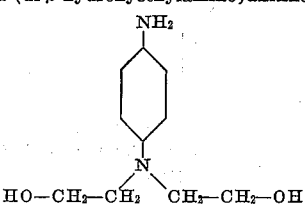

(7) 4-cyclohexylaminoaniline

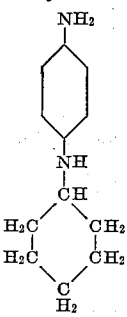

(8) 4-piperidinoaniline

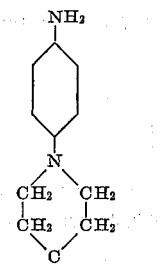

(9) 4-thiomorpholinoaniline

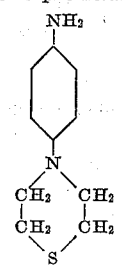

(10) 4-hydroxyaniline

(11) 3-methyl-4-ethylaminoaniline

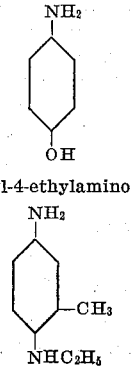

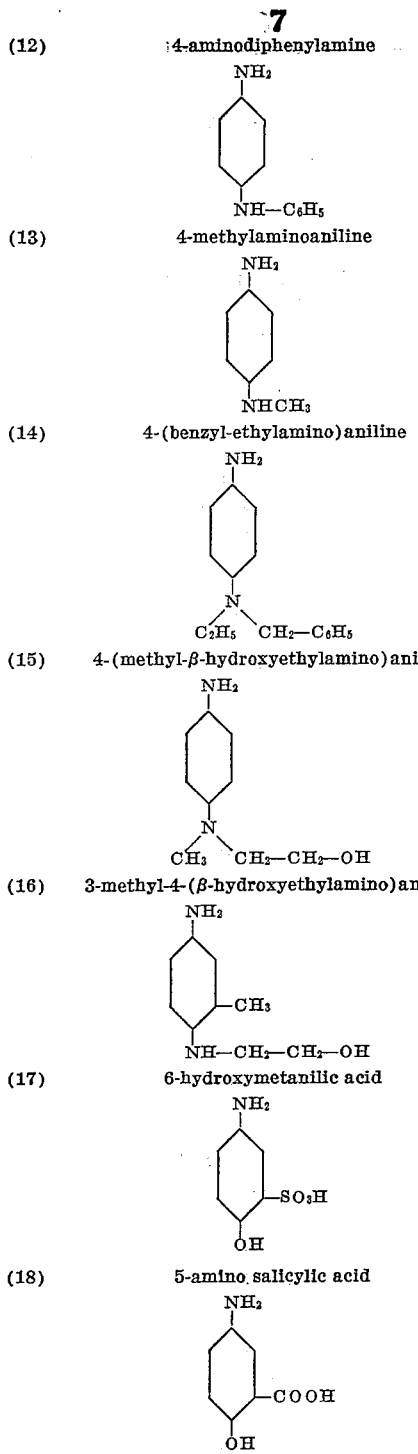

(12) 4-aminodiphenylamine
(13) 4-methylaminoaniline
(14) 4-(benzyl-ethylamino)aniline
(15) 4-(methyl-β-hydroxyethylamino)aniline
(16) 3-methyl-4-(β-hydroxyethylamino)aniline
(17) 6-hydroxymetanilic acid
(18) 5-amino salicylic acid The most essential feature, in fact the most critical feature, of my invention is the requirement that the aromatic radical joined to the pyrazolone by the azo group must contain at least one potent electro-positive substituent in its molecule. The remaining free positions may be occupied by either an electro-negative or a neutral group or substituent. Without the presence of a potent electro-positive substituent, the azo dyes will not be bleached or decolorized when subjected to a treatment in a ferricyanide bleach bath within a reasonable period of time.

The ferricyanide bleach solution employed in accordance with the present invention contains an alkali metal ferricyanide, such as sodium or potassium ferricyanide dissolved in water with or without the presence of other adjuvants. A typical ferricyanide bleach consists of an aqueous solution of an alkali metal and an inorganic halide.

The foregoing solution may be buffered to retard its corrosive effect on treating tanks, trays, and the like. Quantities ranging from 10 to 20 grams per liter of bleach solution of an alkali metal phosphate such as sodium tetraphosphate, disodium phosphate, and the like, have been found to do this effectively, as well as the dialkyl amino alcohols described in United States Patent 2,327,813.

The bleach solution containing the foregoing ingredients may be adjusted to any desired pH value, ranging from 6.5 to 10.0. It is made alkaline by the addition of a small quantity of alkali such as sodium carbonate or sodium or potassium hydroxide. It has been observed that some of the azo pyrazolones, especially those containing hydroxyl groups in the aromatic nucleus, are more readily bleached in a ferricyanide bath which is slightly alkaline, i. e., having a pH slightly above 7.

The following examples describe in detail methods for accomplishing the foregoing objects, but it is to be understood that they are given merely for purposes of illustration and are not to be construed as limiting the scope of the invention.

*Example I*

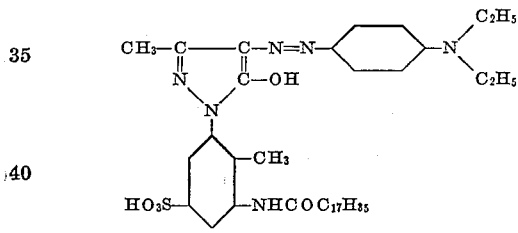

To a solution of 5.5 parts of 1-(2'-methyl-3' - stearamide - 5' - sulfophenyl) - 3 - methyl pyrazolone-5, 0.4 part of sodium hydroxide in 35.0 parts of 85% methanol and 60.0 parts of 28% aqueous ammonium hydroxide, there were added 4.0 parts of gelatin, and the whole was stirred at 40 to 50° C. until a clear solution resulted. The above mixture was treated with a diazo solution which had been prepared in the usual manner from 2.4 parts of 4-diethylaminoaniline dihydrochloride, 2.5 parts of 37% hydrochloric acid, 0.7 part of sodium nitrite and 22.0 parts of water. An additional 30.0 parts of 28% ammonium hydroxide were added, and the coupling reaction was allowed to take place at 40° C. over a period of 2 hours. The dye-gelatin solution was chilled in an ice bath, and the magenta noodles were shredded and washed in cool running water for 3 hours. The weight of material, containing approximately 4% gelatin and 7% filter dye, was 105 parts.

*Example II*

Example I was repeated with the exception that 2.8 parts of 2-ethoxy-4-diethylaminoaniline dihydrochloride were substituted for 2.4 parts of 4-diethylaminoaniline dihydrochloride. The gelatin noodles obtained were dyed red.

*Example III*

Example I was repeated with the exception that 2.2 parts of 4-aminodiphenylamine hydrochloride were substituted for 2.4 parts of 4-diethylaminoaniline dihydrochloride. The gelatin noodles were dyed red-orange.

Example IV

Example I was repeated with the exception that 2.2 parts of 3-methyl-4-ethylaminoaniline dihydrochloride were substituted for 2.4 parts of 4-diethylaminoaniline dihydrochloride. The gelatin noodles were dyed orange.

Example V

Example I was repeated with the exception that 3.0 parts of 4-benzyl-ethylaminoaniline dihydochloride were substituted for 2.4 parts of 4-diethylaminoaniline dihydrochloride. The gelatin noodles were dyed magenta.

Example VI

Example I was repeated with the exception that 2.7 parts of 4-thiomorpholinoaniline dihydrochloride were substituted for 2.4 parts of 4-diethylaminoaniline dihydrochloride. The gelatin noodles were dyed yellow-orange.

Example VII

Example I was repeated with the exception that 2.5 parts of 4-ethyl-β-hydroxyethylaminoaniline dihydrochloride were substituted for 2.4 parts of 4-diethylaminoaniline dihydrochloride. The gelatin noodles were dyed red.

Example VIII

Example I was repeated with the exception that 1.1 parts of 4-hydroxyaniline were substituted for 2.4 parts of 4-diethylaminoaniline dihydrochloride. The gelatin noodles were dyed yellow.

Example IX

Example I was repeated with the exception that 1.9 parts of 6-hydroxy metanilic acid were substituted for 2.4 parts of 4-diethylaminoaniline dihydrochloride. The gelatin noodles were dyed yellow.

Example X

Example I was repeated with the exception that 4.9 parts of 1-(2'-methyl-4'-sulfophenyl)-3-heptadecyl pyrazolone-5 were substituted for 5.5 parts of 1-(2'-methyl-3'-stearamido-5'-sulfophenyl)-3-methyl-5-pyrazolone. The gelatin noodles were dyed magenta.

Example XI

Example IV was repeated with the exception that 4.9 parts of 1-(2'-methyl-4'-sulfophenyl)-3-heptadecyl pyrazolone-5 were substituted for 5.5 parts of 1-(2'-methyl-3'-stearamide-5'-sulfophenyl)-3-methyl pyrazolone-5 as the coupling component. The gelatin noodles were dyed orange.

Example XII

Example VIII was repeated with the exception that 4.9 parts of 1-(2'-methyl-4'-sulfophenyl)-3-heptadecyl pyrazolone-5 were substituted for 5.5 parts of 1-(2'-methyl-3'-stearamide-5'-sulfophenyl)-3-methyl pyrazolone-5 as the coupling component. The gelatin noodles were dyed yellow.

Example XIII

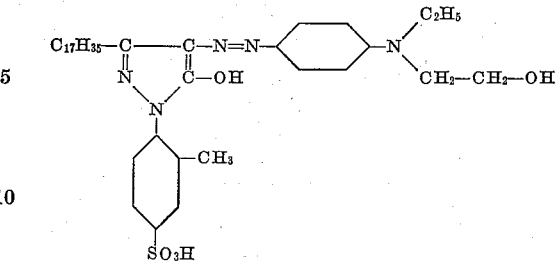

A solution of 4.9 parts of 1-(2'-methyl-4'-sulfophenyl)-3-heptadecyl pyrazolone-5 in 30.0 parts of pyridine was treated at 0° C. with a diazo solution which had been prepared in the usual manner from 2.5 parts of 4-(ethyl-β-hydroxyethylamino) aniline dihydrochloride, 2.5 parts of concentrated hydrochloric acid, 0.7 part of sodium nitrite and 12 parts of water. After the mixture had been allowed to slowly warm up to room temperature, the pyridine was removed under vacuum. The residue was suspended in 50 parts of water, and the mixture was acidified with hydrochloric acid. The tarry semi-solid dyestuff which separated was removed from the supernatant liquid and was washed by decantation. It was dissolved in dilute sodium hydroxide solution and was reprecipitated with acetic acid. The semi-solid material after titration with dilute sulfuric acid, was converted into a yellow solid which could be easily removed by filtration and washed with water. The dyestuff which is readily soluble in dilute aqueous sodium carbonate, forms a red solution.

Example XIV

Example XIII was repeated with the exception that 2.5 parts of 2-methyl-4-diethylaminoaniline dihydrochloride were substituted for 2.5 parts of 4-(ethyl-β-hydroxyethylamino) aniline dihydrochloride.

Example XV

Example XIII was repeated with the exception that 1.1 parts of 4-hydroxyaniline were substituted for 2.5 parts of 4-(ethyl-β-hydroxyethylamino) aniline dihydrochloride.

Example XVI

Example XIII was repeated with the exception that 2.2 parts of the diazo component 3-methyl-4-ethylaminoaniline dihydrochloride and 5.5 parts of 1-(2'-methyl-3'-stearamide-5'-sulfophenyl)-3-methyl pyrazolone-5 were substituted for 2.5 parts of 4-(ethyl-β-hydroxyethylamino)-aniline dihydrochloride and 4.9 parts of 1-(2'-methyl-4'-sulfophenyl)-3-heptadecyl pyrazolone-5.

Example XVII 10 parts of each of the azo pyrazolone gelatin noodles obtained from Examples I, II, IV, VI, VII, X and XI and 50 parts of water were melted down at 40° C. and the liquid gelatin dye suspensions coated on separate film bases in the customary manner. The filter dyes were destroyed by immersing the film strips for 10–15 minutes in a ferricyanide bleach bath of the following composition:

| | Grams |
|---|---|
| Potassium ferricyanide | 30 |
| Potassium bromide | 10 |
| Water to make 1 liter. | |

Example XVIII 10 parts of each of the azo pyrazolone gelatin noodles obtained from Examples III, V, VIII, and IX, and 50 parts of water were melted down at 40° C. and the liquid dye suspensions coated on separate film bases in the customary manner. The filter dyes were destroyed by immersing the film strips for 10–15 minutes in a ferricyanide bleach bath of the following composition which has a pH of 10:

| | Grams |
|---|---|
| Potassium ferricyanide | 30 |
| Potassium bromide | 10 |
| Sodium carbonate | 10 |

Water to make 1 liter.

Example XIX 0.2 part of each of the solid dyes of Examples XIII, XIV, and XVI was suspended in 10 parts of water and brought into solution by the addition of a 10% sodium hydroxide solution. The clear dye solutions were added to 30 parts of a 5% gelatin dispersion and the resulting gelatin-dye dispersions coated on separate film bases in the customary manner. The filter dyes were bleached completely by immersing them for 10–15 minutes in a ferricyanide composition of Example XVII.

Example XX 0.2 part of the solid azo dye of Example XV was suspended in 10 parts of water and brought into solution by the addition of a 10% sodium hydroxide solution. The clear dye solution was added to 30 parts of a 5% gelatin dispersion and the resulting gelatin-dye dispersion coated on a film base in the customary manner. The filter dye was bleached completely by immersing it for 10–15 minutes in a ferricyanide composition of Example XVIII.

Example XXI

A multilayer color film containing the usual color components in the panchromatic and orthochromatic silver-halide emulsion and which were separated from the blue sensitive emulsion by means of a filter layer containing the yellow azo dye of Example VIII, was prepared. The color images were first developed in the customary manner with 4-diethylaminoaniline, and then the silver images were oxidized and the yellow filter dye was removed simultaneously by treating the film for 10 minutes in a bleach composition of Example XVIII. After fixation with sodium thiosulfate, there remained a color negative transparency.

It will be understood that where, in the claims appended hereto the term "filter layer" is used, that such is intended to include anti-halation layers.

While the present invention has been described in considerable detail with reference to certain preferred azo pyrazolones and uses, it is understood that the new class of azo pyrazolones and their use as filter and anti-halation materials is not limited thereto and that numerous variations and modifications described in the foregoing specification may be made.

I claim:

1. A photographic material which comprises a support, a light sensitive gelatinous silver-halide emulsion layer containing a color component which couples with the oxidation products of a primary aromatic amino developer to form a dye not bleachable in ferricyanide bleach bath and a separate filter layer free from silver halides containing a non-diffusing azo pyrazolone in which the aromatic azo radical joined to the pyrazolone contains a potent electro-positive substituent in the position para to the azo linkage and selected from the class consisting of hydroxy and an amino group, said azo pyrazolone being unaffected by the usual color developers and processing baths and being completely decolorized in a ferricyanide bleach composition.

2. A photographic material which comprises a support, a light sensitive gelatinous silver-halide emulsion layer containing a color component which couples with the oxidation products of a primary aromatic amino developer to form a dye not bleachable in ferricyanide bleach bath and a separate filter layer free from silver halides containing a non-diffusing azo pyrazolone having the formula:

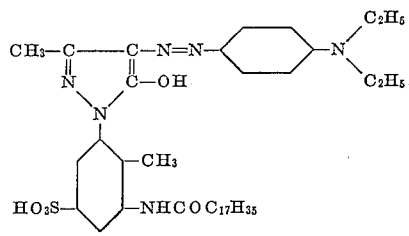

said azo pyrazolone being unaffected by the usual color processing baths and being completely decolorized in a ferricyanide bleach composition.

3. A photographic material which comprises a support, a light sensitive gelatinous silver halide emulsion layer containing a color component which couples with the oxidation products of a primary aromatic amino developer to form a dye not bleachable in ferricyanide bleach bath and a separate filter layer free from silver halides containing a non-diffusing azo pyrazolone having the formula:

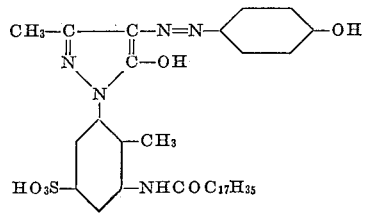

said azo pyrazolone being unaffected by the usual color processing baths and being completely decolorized in a ferricyanide bleach composition.

4. A photographic material which comprises a support, a light sensitive gelatinous silver-halide emulsion layer containing a color component which couples with the oxidation products of a primary aromatic amino developer to form a dye not bleachable in ferricyanide bleach bath and a separate filter layer free from silver halides containing a non-diffusing azo pyrazolone having the formula:

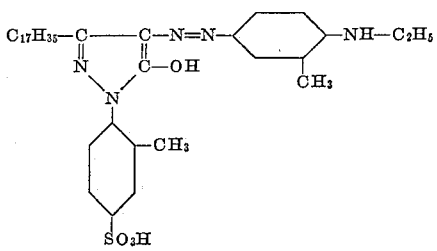

said azo pyrazolone being unaffected by the usual color processing baths and being completely decolorized in a ferricyanide bleach composition.

5. A multilayer color film comprising a support and three light sensitive gelatinous silver halide emulsion layers containing a color component which couples with the oxidation products of a primary aromatic amino developer to form a dye not bleachable in ferricyanide bleach bath, two of said emulsion layers being separated by a filter layer free from silver halides containing a non-diffusing azo pyrazolone in which the aromatic azo radical joined to the pyrazolone contains a potent electro-positive substituent in the position para to the azo linkage and selected from the class consisting of hydroxy and an amino group, said azo pyrazolone being unaffected by the usual color developers and processing baths and being completely decolorized in a ferricyanide bleach composition.

6. A multilayer color film comprising a support and three light sensitive gelatinous silver halide emulsion layers containing a color component which couples with the oxidation products of a primary aromatic amino developer to form a dye not bleachable in ferricyanide bleach bath, two of said emulsion layers being separated by a filter layer free from silver halides containing a non-diffusing azo pyrazolone having the formula:

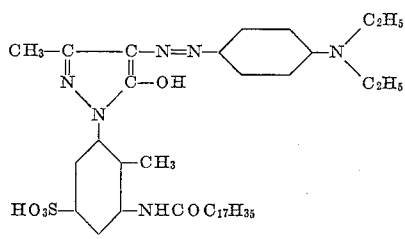

said azo pyrazolone being unaffected by the usual color processing baths and being completely decolorized in a ferricyanide bleach composition.

7. A multilayer color film comprising a support and three light sensitive gelatinous silver halide emulsion layers containing a color component which couples with the oxidation products of a primary aromatic amino developer to form a dye not bleachable in ferricyanide bleach bath, two of said emulsion layers being separated by a filter layer free from silver halides containing a non-diffusing azo pyrazolone having the formula:

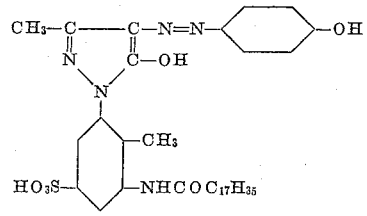

said azo pyrazolones being unaffected by the usual color processing baths and being completely decolorized in a ferricyanide bleach composition.

8. A multilayer color film comprising a support and three light sensitive gelatinous silver halide emulsion layers containing a color component which couples with the oxidation products of a primary aromatic amino developer to form a dye not bleachable in ferricyanide bleach bath, two of said emulsion layers being separated by a filter layer free from silver halides containing a non-diffusing azo pyrazolone of the formula:

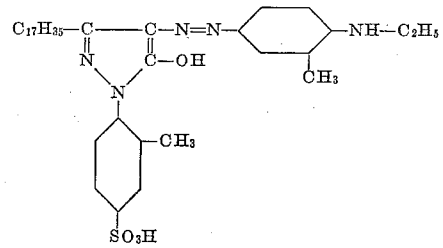

said azo pyrazolone being unaffected by the usual color processing baths and being completely decolorized in a ferricyanide bleach composition.

References Cited in the file of this patent

UNITED STATES PATENTS

| Number | Name | Date |
| --- | --- | --- |
| 2,186,849 | Wilmanns | Jan. 9, 1940 |
| 2,271,230 | Peterson et al. | Jan. 27, 1942 |
| 2,306,410 | Schinzel | Dec. 29, 1942 |
| 2,350,380 | White | June 6, 1944 |
| 2,369,171 | Murray | Feb. 13, 1945 |
| 2,435,616 | Vittum et al. | Feb. 10, 1948 |
| 2,455,170 | Glass et al. | Nov. 30, 1948 |